APPARATUS FOR SUPERIMPOSING SYMBOLS ON A CATHODE RAY TUBE DISPLAY

Filed Dec. 13, 1965 3 Sheets-Sheet 1

INVENTORS
ALI A. FIORLETTA
RAYMOND WINFIELD
BY H P Terry
ATTORNEY

INVENTORS
ALI A. FIORLETTA
RAYMOND WINFIELD
BY
H P Terry
ATTORNEY

APPARATUS FOR SUPERIMPOSING SYMBOLS ON A CATHODE RAY TUBE DISPLAY

Filed Dec. 13, 1965 3 Sheets-Sheet 3

INVENTORS
ALI A. FIORLETTA
RAYMOND WINFIELD
BY
ATTORNEY

United States Patent Office 3,499,979
Patented Mar. 10, 1970

3,499,979

APPARATUS FOR SUPERIMPOSING SYMBOLS ON A CATHODE RAY TUBE DISPLAY

Ali A. Fiorletta, Jamaica, and Raymond Winfield, Wantagh, N.Y., assignors to Sperry Rand Corporation, a corporation of Delaware Filed Dec. 13, 1965, Ser. No. 513,270
Int. Cl. H04n 3/16
U.S. Cl. 178—6.8 11 Claims

ABSTRACT OF THE DISCLOSURE

The superposition of symbols on a TV display by utilizing one of the yoke driver deflection amplifiers in a dual mode. During the vertical sweep of the TV raster, the amplifier is utilized in a fly-back resonant mode. During the vertical retrace time of the raster, the amplifier is switched to linear operation.

The present invention relates to data display systems wherein a symbol or pattern is superimposed on a cathode ray tube display such as a television raster.

This invention also relates to magnetic yoke driver deflection amplifiers for alternately generating a television raster and a symbol or pattern by means of a multiplexing technique in order that the display appears as a symbol or pattern superimposed on the television video picture.

The present invention is particularly applicable to data display systems where part of the data is compatible with a television raster and the balance with Lissajous pattern generation techniques or other types of pattern or symbol generation techniques. An advantageous feature of the present invention is that the television raster is provided in a conventional manner and is not sacrificed in any way, with the Lissajous or other patterns being written on the cathode ray tube screen during the vertical retrace time of the television raster during which time no television video signals are normally present. In the present invention, the vertical retrace time is utilized by alternately switching the horizontal magnetic yoke driver amplifier from a fly-back resonant driver mode for generating the television raster horizontal scanning to a linear feedback operational amplifier mode for generating the symbols. This technique achieves fast horizontal ($x$-axis) retrace when required for television scanning modes at no significant increase in power requirements, whereas in the absence of the present invention, if a linear amplifier was required to achieve the same retrace speed, the power requirements might be increased by a factor of five or more. Deflection coil resonance is used to achieve fast TV horizontal retrace speed.

It is a primary object of the present invention to provide superimposed information with respect to a cathode ray tube display without sacrificing the quality of the display.

It is another object of the present invention to provide a movable symbol or pattern superimposed on a television raster utilizing a multiplexing technique requiring a minimum of additional equipment.

It is an additional object of the present invention to provide an amplifier having two modes of operation, one being a resonant driver mode and the other being a linear mode with means for switching therebetween.

These and other objects of the present invention will become apparent by referring to the following drawings in which.

Figure 1:
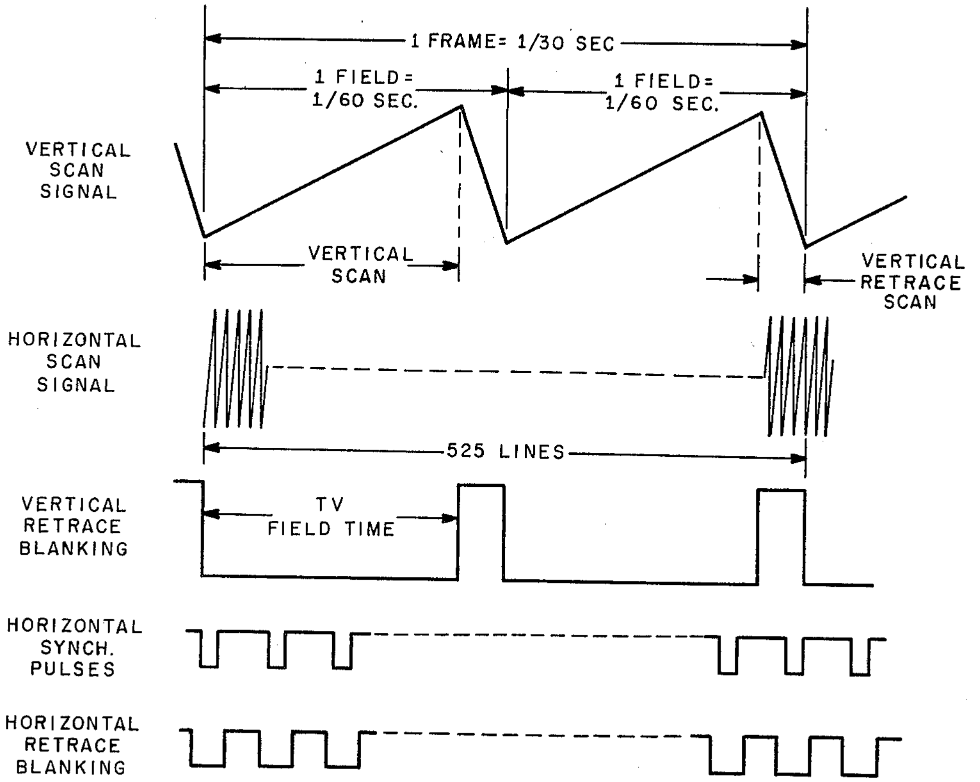
FIG. 1 shows the time relationships and waveforms of the various signals utilized in producing a conventional television raster.

As shown in FIG. 1, a standard television frame consists of two fields each scanned in a 60th of a second and the two fields comprise 525 lines interlaced 2 to 1 with blanking to prevent appearance of horizontal scanning lines during vertical retrace. The total number of lines displayed as well as the number of lines not displayed during vertical retrace blanking can vary from TV system to TV system particularly in closed circuit TV systems which are not standardized. For each field a vertical scan as well as the aforementioned horizontal scans are required, interrelated as shown in FIG. 1. The horizontal synch pulses and the vertical and horizontal retrace blanking signals are also shown in FIG. 1. They are conventional and in combination provide a standard TV raster on the screen of the cathode ray tube.

Figure 2:
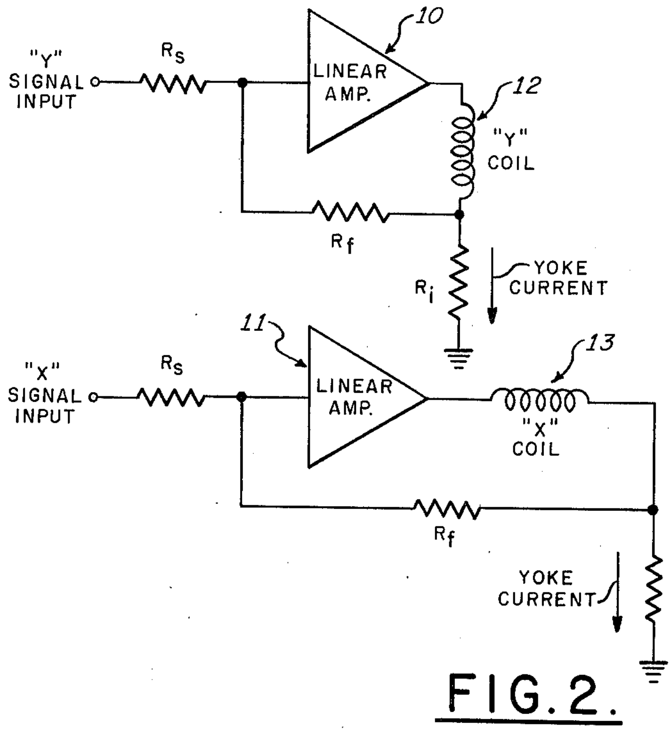
FIG. 2 is an electrical schematic diagram of X and Y linear amplifiers of the type normally required to generate symbols alone.

In accordance with the present invention, as shown in FIG. 2, the generation of symbols or patterns such as Lissajous patterns superimposed on the cathode ray tube screen is achieved by means of two linear amplifiers 10 and 11 responsive to Y input signals and X input signals, respectively. The amplifiers 10 and 11 translate input rectangular coordinate signal voltages $E_y$ and $E_x$ into respective currents through the Y and X deflection coils 12 and 13, respectively, which comprise the yoke. To provide this translation and linear amplification, the Y signal input is connected through a summing resistor $R_s$ to the amplifier 10 which has its output connected to one extremity of the Y coil 12. The other extremity of Y coil 12 is connected through a current sampling resistor $R_i$ to ground potential. A feedback connection is provided by means of a feedback resistor $R_f$ which has one terminal connected to the junction of the Y coil 12 and the current sampling resistor $R_i$ and its other terminal connected to the junction of the summing resistor $R_s$ and the input terminal of the amplifier 10. In a similar manner the X signal input is connected through a summing resistor $R_s$, the amplifier 11, the X coil 13, a current sampling resistor $R_i$ and thence to ground potential with the feedback connection being formed by the feedback resistor $R_f$.

Figure 3:
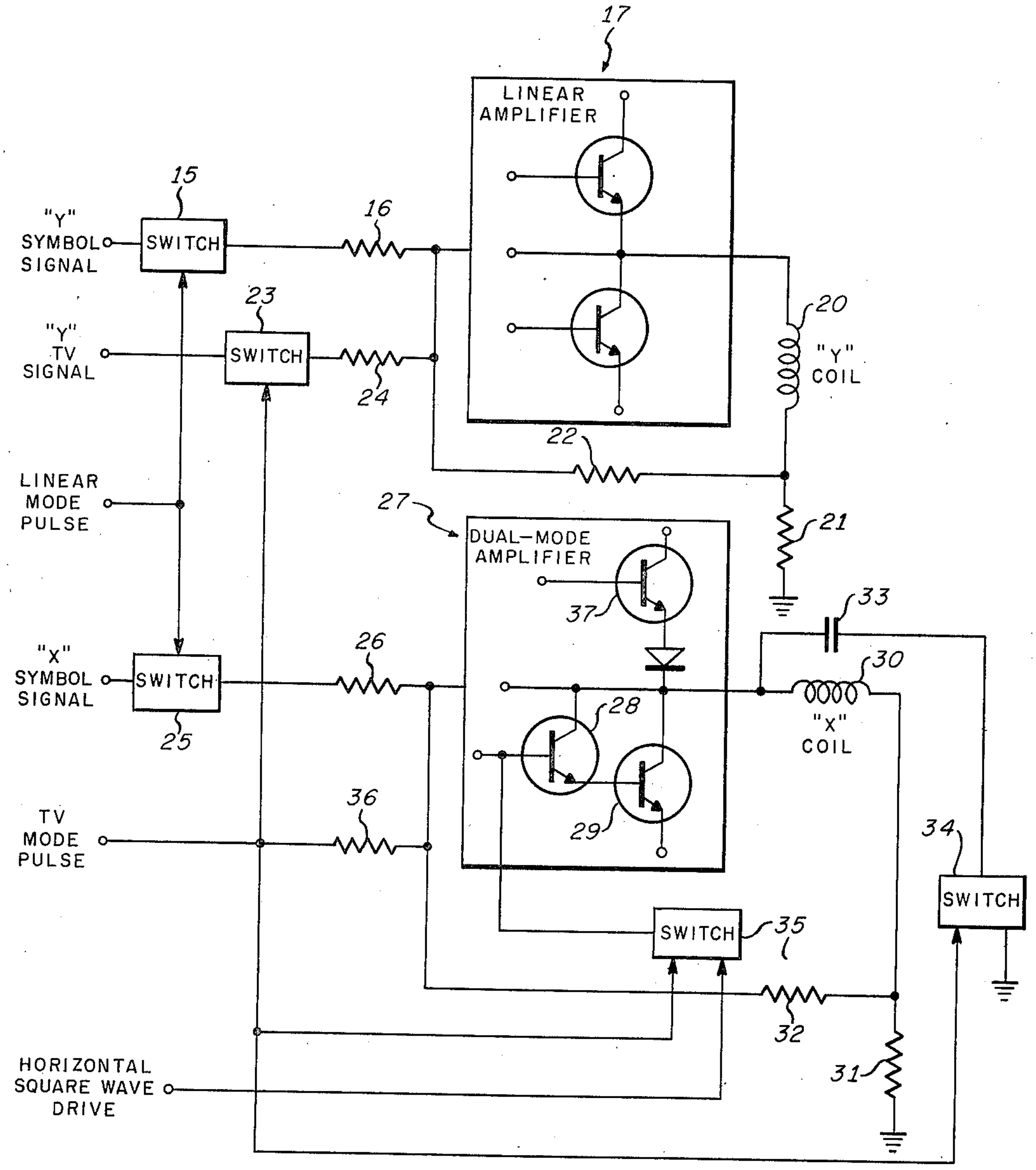
FIG. 3 is an electrical schematic diagram showing in part the dual-made linear and television amplifier as well as typical switching circuits utilized in the present invention.

Referring now to FIG. 3, the dual-mode amplifier of the present invention is represented by block 27 which includes some of the components comprising the amplifier circuit. The transistors 28, 29 and 37 comprise the power output stage when the dual-mode amplifier 27 functions in the linear mode as an operational amplifier. The transistors 28 and 29 provide the horizontal drive signals when the amplifier 27 is utilized in the TV mode. Provisions for alternately switching from the TV mode to the linear amplifier mode in order that the symbols or patterns can be introduced onto the cathode ray tube screen during the time normally alloted for vertical retrace of the TV raster are shown. Although the present invention will be described with respect to the superposition of a Lissajous figure on a TV raster, it will be appreciated that other types of symbols or patterns may also be readily superimposed.

As shown in FIG. 3, a Y Lissajous signal is connected through a switch 15 and a summing resistor 16 to the input terminal of a linear amplifier 17. The amplifier 17 operates at all times in a linear mode for both symbols and the relatively slow 60 cycle per second TV sawtooth scan. The output of the amplifier 17 is connected to a Y deflection coil 20 which in turn is connected through a current sampling resistor 21 to ground potential. A feedback resistor 22 is conected from the junction of the Y coil 20 and the current sampling resistor 21 to the input terminal of the amplifier 17. The Y TV signal is connected through a switch 23 and a summing resistor 24 to the input terminal of the amplifier 17.

The X Lissajous signal is connected through a switch 25 and a summing resistor 26 to the input terminal of a dual-mode amplifier 27. The amplifier 27 has its output connected to an X coil 30 which in turn is connected through a current sampling resistor 31 to ground potential. A feedback connection is provided by means of a feedback resistor 32 connected from the junction of the X coil 30 and the current sampling resistor 31 to the input terminal of the amplifier 27. A capacitor 33 is connected from the junction of the output of amplifier 27 and X coil 30 to switch 34. Switch 34 connects the capacitor 33 to ground during TV field time and allows the capacitor 33 to resonate with the X coil 30 at a frequency high enough to produce a fast horizontal retrace. During the vertical retrace time, when the symbols are generated by amplifier 27 operating in the linear mode, the switch 34 is open thereby disconnecting capacitor 33 from ground. In the linear mode the amplifier 27 functions as an operational amplifier of which transistors 28, 29 and 37 comprise the power output stage. In the TV mode, the transistors 28 and 29 are actuated by a horizontal square wave drive signal via a switch 35 and the transistor 37 is rendered ineffectual in a manner to be explained. The switch 35 provides direct horizontal drive, during the TV mode, to the active transistor power units within amlifier 27. A TV mode pulse is connected to actuate the switches 23, 34, and 35 and is also connected through a summing resistor 36 to the input terminal of the amplifier 27. A linear mode pulse is connected to actuate the switches 15 and 25. Both mode pulses are synchronous with, and timed from, a standard TV synchronizing generator (not shown).

In operation, when the amplifier 27 operates as a TV resonant coil driver, the power transistor 37 in amplifier 27 is turned off by the amplifying action of the TV mode pulse applied through the summing resistor 36. Simultaneously a square wave is applied via switch 35 to turn the power transistors 28 and 29 on and off at the TV horizontal frequency of the applied square wave. This square wave drive to the X coil 30 by means of the transistor switching action of the transistors 28 and 29 produces alternately a sawtooth current in the X coil 30 followed by a rapid resonant retrace when the transistors 28 and 29 are turned off. The sequences of forward horizontal scan followed by fast retrace continues for the duration of the vertical field time during which the vertical Y-axis amplifier is driving the Y coil 20 with a linear 60 cps. sawtooth current. The hortizontal scan and vertical scan together produce the conventional rectangular raster scanning currents in the deflection yoke coils. At the completion of the raster scan, the switches 23 and 35 are turned off thereby removing the TV inputs from the Y and X amplifiers, while the switches 15 and 25 are turned on to allow Y and X symbol inputs to the amplifiers 17 and 27 respectively. Turning off the switch 35 restores the amplifier 27 to the linear state for symbol generation.

Figure 4:
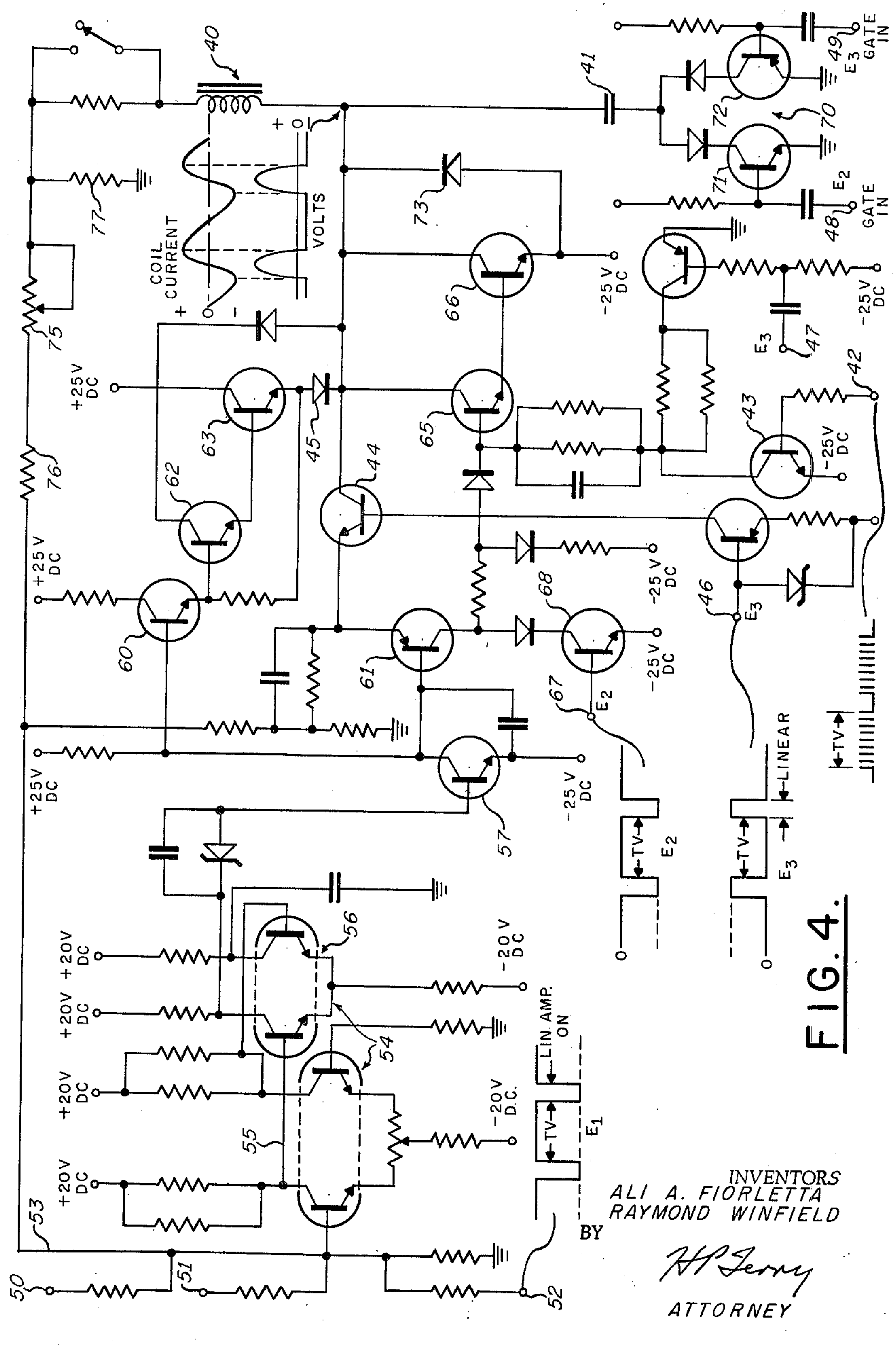
FIG. 4 is a detailed wiring schematic showing a preferred embodiment of a dual-mode amplifier in accordance with the present invention.

Referring now to FIG. 4, a detailed schematic of the present invention is shown in which the components of the amplifier 27 of FIG. 3 are illustrated in detail. It should be noted that the transistors 28, 29 and 37 as illustrated in FIG. 3 correspond to transistors 65, 66 and 63 of FIG. 4 respectively. The horizontal deflection coil 40 has a capacitor 41 connected across it in order that in TV operation the deflection coil 40 is allowed to resonate with the capacitor 41 for one half a resonant cycle in a conventional manner. The horizontal TV input signal is applied at input terminal 42 and is connected through a TV driver amplifier 43. A positive pulse equal in duration to the retrace blanking period is connected through input terminals 46, 47 and 49, and a negative pulse to terminals 48 and 67 for setting the dual-mode amplifier in the linear symbol generation mode. Aplication of these voltages restores the amplifier to the linear amplifier configuration. The resonating characteristic of the deflection coil 40 and capacitor 41 produces a resonant high voltage condition which must be blocked from entering the linear portion of the amplifier as the low voltage transistors therein may be damaged. The blocking transistor 44 and the blocking diode 45 are high voltage blocking components which perform the blocking function.

The linear portion of the dual-mode amplifier includes input terminals 50, 51 and 52. The terminal 50 is responsive to X-axis symbol signals in the linear symbol mode while the terminal 51 is responsive to the horizontal or X positioning voltage for placing the symbol anywhere in the display. A 60 cycle control gate signal is applied to input terminal 52 for saturating the linear portion of the circuit during the TV mode in order to disable it and to drive it to an extreme state which cuts off the top deflection coil driver stage consisting of transistors 60, 62 and 63, thereby rendering it ineffectual. This is a necessary condition for the TV mode wherein the deflection coil current is directly controlled only by transistors 65 and 66. The input signals appearing on terminals 50, 51 and 52 as well as a feedback signal appearing on lead 53 are connected to the input of a two-stage differential amplifier 54 which has a first stage 55 and a second stage 56. The output of the differential amplifier 54 is connected through a driver 57 which in turn has its output connected to an emitter follower 60 and an inverter 61. The emitter follower 60 and the inverter 61 are connected in push-pull relationship. The emitter follower 60 has its output connected to two stages of current amplification utilizing transistors 62 and 63, the output of the latter in part providing the driving signal to the deflection coil 40. The output of the inverter 61 is connected through an amplifier 65 whose emitter is connected to a transistor amplifier 66, the collector output of which, in combination with the output of the transistor 63, drives the deflection coil 40.

The other end of the deflection coil 40 is connected to a current sampling resistor 77, the other end of which is connected to ground. The voltage at the junction of the deflection coil 40 and the current sampling resistor 77 is of the same waveform as the current through the deflection coil. This voltage is impressed on feedback resistors 75 and 76, the other end of which is returned to connection 53 thereby forming an operational amplifier.

The non-TV sections of the dual-mode amplifier must be turned off in the TV mode so they will not dissipate power and damp the oscillatory cycle needed for the fast retrace. The undesirable damping of the LC resonance by the linear portion would otherwise affect efficiency and symmetry of the deflection coil current. The capacitor 41 is chosen to resonate with the deflection coil 40 for a half cycle period which is short enough to satisfy the retrace time requirements, i.e. ten microseconds in a standard 525 line TV. Since the emitter follower 60 and the inverter 61 form a push-pull system, the input control voltage for TV operation can only turn one or the other off. As shown, the upper portion consisting of the emitter follower 60 and amplifiers 62 and 63 are turned off by the voltage $E_1$ applied to the terminal 52. To turn off the inverter 61 (which would normally be turned fully on if the emitter follower 60 is turned off assuming class AB or B linear operation), a negative TV control voltage $E_2$ is applied to an input terminal 67 and applied through an amplifier 68 to turn off the inverter 61 in the TV mode.

The capacitor 41 is effective during the TV mode but is rendered ineffective during the linear mode by means of a switch 70 which disconnects the bottom of the capacitor 41 from ground. The switch 70 consists of switching transistors 71 and 72 which in combination form a bidirectional on-off switch. The bases of the switching transistors 71 and 72 are responsive to the TV input control voltages $E_2$ and $E_3$ for connecting the capacitor 41 to ground during the TV mode of operation.

Thus, during the TV mode of operation the dual-mode amplifier operates in the manner of a conventional deflection amplifier with the capacitor 41 resonating with the deflection coil 40 to provide fast horizontal retrace during one half cycle of shocked oscillation after which the damper diode 73 conducts to stop oscillation. A 0.1 microfarad capacitance value is chosen for a coil 40 having an inductance of 100 microhenries so that coil 40 and capacitor 41 resonate at 50 kilocycles to retrace the beam in a half cycle of 10 microseconds. During this period, the deflection coil current reverses to the opposite peak at which point damping occurs via diode 73 to end resonance and the sawtooth current ramp begins again. During linear operation, the capacitor 41 is disconnected from ground by means of the bidirectional switch 70 while the current waveform through deflection coil 40 is fed back to connection 53 through feedback resistors 75 and 76 thereby forming an operational amplifier.

The rapid and smooth switching between the TV and linear modes of operation at a 60 c.p.s. rate provides a flicker free symbol or pattern superimposed upon the standard TV raster with no sacrifice to the raster size or content since the signals for the raster continue to be provided by a standard TV camera and synchronizing generator. The time allotted to displaying the TV picture remains unchanged.

It will be appreciated that a plurality of symbols or patterns such as Lissajous figures may be simultaneously superimposed on the TV raster, only one of which has been explained for purposes of simplicity.

The invention has been described in terms of a dual-mode amplifier which functions in the TV mode during the vertical scan and in the linear mode during the vertical retrace. Since the horizontal scan signals are generated in the conventional resonant fly-back mode of operation, the horizontal sweeps tend to be non-linear. It will be appreciated that the dual-mode amplifier may also function as a linear amplifier during each horizontal sweep so as to generate a linear horizontal sweep signal. In this manner, the dual-mode amplifier would function in the resonant fly-back mode only during each horizontal retrace interval.

The values of the components shown in FIG. 4 are for a typical system operating in accordance with the teaching of the present invention.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In apparatus for superimposing symbols on a cathode ray tube display, cathode ray tube means having a controllable electron beam, means coupled to said cathode ray tube for controlling said electron beam including resonant circuit means for providing a rapid retrace of said electron beam, said resonant circuit means including an induction type deflection coil and a capacitor, dual-mode amplifying means coupled to said cathode ray tube operable in a linear mode for symbol generation for providing electron beam controlling signals to said deflection coil for controlling said electron beam for superimposing a symbol on said cathode ray tube display, means coupled to said resonant circuit means for selectively rendering said capacitor ineffective during said symbol generation mode and for selectively rendering said deflection coil effective in a feedback connection between the output of said dual mode amplifier means and its input thereby forming a linear operational amplifier from resonant driver amplifier means for effectively superimposing a symbol on said cathode ray tube display.

2. In a system for superimposing symbols on a TV raster for providing a composite display, dual-mode amplifying means responsive to symbol generating signals, symbol positioning signals and TV signals, resonant circuit means comprising deflection coil inductance means and capacitor means, said dual-mode amplifying means and said resonant circuit means providing fly-back driver operation in response to said TV signal, and means for rendering said capacitor means selectively ineffective and for simultaneously rendering said deflection coil inductance means effective in a feedback connection between the output of said dual mode amplifying means and its input for providing linear amplifier operation with respect to said symbol signals.

3. In a system of the character recited in claim 2 further including means for rendering said dual-mode amplifying means an operational amplifier when said inductor means is included in said feedback connection for providing linear amplification of said symbol and positioning signals.

4. In a system of the character recited in claim 2 further including means for rendering at least a portion of said dual-mode amplifying means ineffective during said TV mode and for rendering said capacitor means as well as TV portions of said amplifying means ineffective during said linear mode.

5. In a system of the character recited in claim 2 further including means for blocking the resonant inductor signal provided by said resonant circuit means to prevent damage to said ineffective portions of said dual-mode amplifying means during said TV mode.

6. In apparatus for superimposing symbols on a cathode ray tube display, cathode ray tube means having a controllable electron beam, deflection means for controlling said electron beam, resonant circuit means for providing a resonant circuit with respect to said deflection means to provide a rapid retrace of said electron beam, dual-mode amplifying means for providing electron beam deflection signals to said deflection means, said dual-mode amplifying means being selectively operable in a linear mode or a resonant retrace mode, and controlling means for selecting said linear mode or said resonant retrace mode and for rendering said resonant circuit means ineffective during said linear mode.

7. In apparatus of the character recited in claim 6 further including feedback means between the output of said dual mode amplifing means and its input respinsive to said electron beam deflection signals for providing feedback signals to said dual-mode amplifying means, in which said dual-mode amplifying means includes components operable in both said modes, and in which said controlling means provides signals for rendering said feedback means and the components of said dual-mode amplifying means which are not operable in both said modes ineffective during said resonant retrace mode.

8. In apparatus of the character recited in claim 7 in which said deflection means comprises magnetic deflection coil means, said resonant circuit means comprises capacitor means, and said components operable in both said modes comprises a portion of the power output stage of said dual-mode amplifying means.

9. In apparatus of the character recited in claim 8 in which said feedback means and said dual-mode amplifying means function in said linear mode as a linear operational amplifier for superimposing symbols on said cathode ray tube display, and said portion of said power output stage functions in said resonant retrace mode as a resonant retrace driving amplifier.

10. In apparatus of the character recited in claim 6 in which said cathode ray tube display comprises a television raster, and said dual-mode amplifying means is operable in said linear mode during the vertical retrace intervals of said television raster and in said resonant retrace mode during the vertical scan intervals of said television raster.

11. In apparatus of the character recited in claim 10 in which said controlling means further includes switching means for selectively providing symbol signals to said dual-mode amplifying means in said linear mode or raster generating signals to said portion of said power output stage in said resonant retrace mode, and said dual-mode amplifying means further includes means for blocking signals to said components of said dual-mode amplifying means which are ineffective in said resonant retrace mode for preventing damage thereto.

References Cited

UNITED STATES PATENTS

| | | | |
|---|---|---|---|
| 3,164,822 | 1/1965 | Uphoff | 340—324.1 |
| 3,210,601 | 10/1965 | Walker | 315—27 |
| 3,325,036 | 6/1965 | Carlock et al. | 340—324.1 |

ROBERT L. GRIFFIN, Primary Examiner

BARRY L. LEIBOWITZ, Assistant Examiner

U.S. Cl. X.R.

178—6; 179—3; 340—324.1